United States Patent
Reese

(10) Patent No.: US 11,800,005 B2
(45) Date of Patent: Oct. 24, 2023

(54) CELL PHONE TOPPER

(71) Applicant: Harvey Reese, Philadelphia, PA (US)

(72) Inventor: Harvey Reese, Philadelphia, PA (US)

( * ) Notice: Subject to any disclaimer, the term of this patent is extended or adjusted under 35 U.S.C. 154(b) by 30 days.

(21) Appl. No.: 17/195,599

(22) Filed: Mar. 8, 2021

(65) Prior Publication Data

US 2022/0286547 A1 Sep. 8, 2022

(51) Int. Cl.
*G09G 3/00* (2006.01)
*H04M 1/725* (2021.01)
*G09G 3/34* (2006.01)
*G09G 3/32* (2016.01)

(52) U.S. Cl.
CPC .............. *H04M 1/725* (2013.01); *G09G 3/32* (2013.01); *G09G 3/3406* (2013.01); *G09G 2330/026* (2013.01); *G09G 2330/027* (2013.01)

(58) Field of Classification Search
CPC .......... G06F 3/167; G06F 3/011; G06F 1/163; G06F 1/1632; G06F 3/14
See application file for complete search history.

(56) References Cited

U.S. PATENT DOCUMENTS

| | | | |
|---|---|---|---|
| 5,539,165 A * | 7/1996 | Wu | H01H 27/06 200/43.11 |
| 2013/0241839 A1* | 9/2013 | Walker | G06F 3/04883 345/173 |
| 2018/0188940 A1* | 7/2018 | Pauna | G06F 3/04886 |
| 2021/0014352 A1* | 1/2021 | Harrell | H04B 1/3888 |
| 2021/0291061 A1* | 9/2021 | Tulewicz | A63F 13/86 |

* cited by examiner

*Primary Examiner* — Michael A Faragalla
(74) *Attorney, Agent, or Firm* — Michael J. Foycik, Jr.

(57) ABSTRACT

A cell phone topper for attachment to a cell phone or smart phone can capture the attention of subjects in public settings and social settings, for photography and for other purposes such as marketing and advertising. It is intended to hold the attention of the subject long enough to get a good picture, that is, long enough for the photographer to perform one or more of the following: frame the subject, adjust the focus, adjust lighting, adjust magnification, and select flash settings. The cell phone topper which includes an attachment having a support portion and a lighted sign having indicia, A further embodiment includes an attachment having a support portion and an animated moving portion.

9 Claims, 7 Drawing Sheets

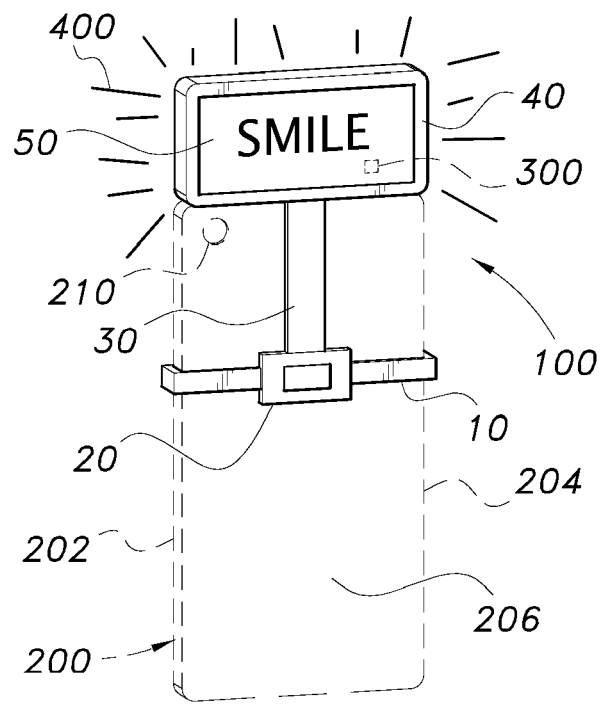
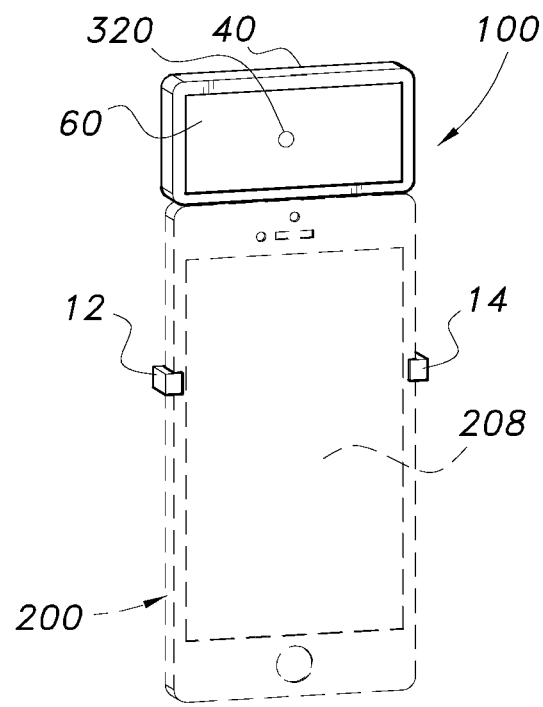
FIG. 1
FIG. 2
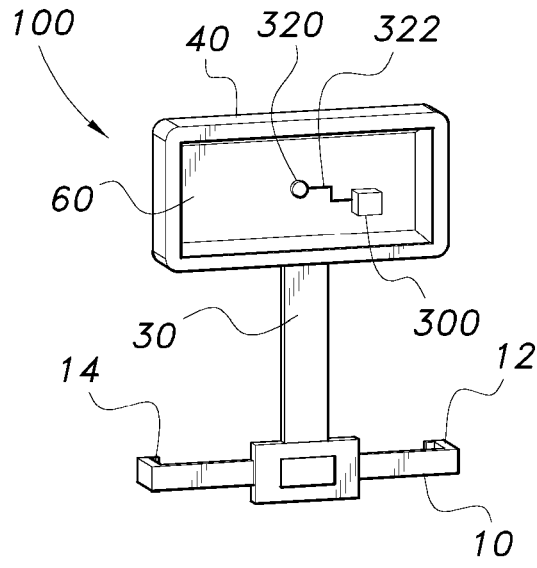
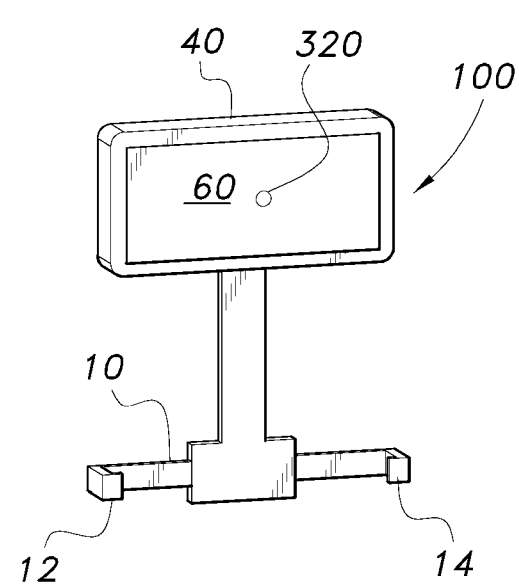
FIG. 3
FIG. 4

CELL PHONE TOPPER

CROSS REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to accessories and attachments for cell phones and smart phones having cameras, and particularly to displays for use during photography.

BACKGROUND OF THE INVENTION

It is a problem in the art of photography to take pictures of subjects in natural settings and social settings in which the subjects are not posed, and which nonetheless capture the face of the subject.

It is a further problem to capture the attention of subjects in public settings and social settings, whether for photography and/or for other purposes such as marketing and advertising.

SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides a device to aid in taking pictures of subjects in natural settings and social settings in which the subjects are not posed, and which nonetheless capture the face of the subject.

The device of the present invention can capture the attention of subjects in public settings and social settings, whether for photography and/or for other purposes such as marketing and advertising. The present invention is intended to hold the attention of the subject long enough to get a good picture, i.e., long enough for the photographer to perform one or more of the following: frame the subject, adjust the focus, adjust lighting, adjust magnification, and select flash settings.

The device of the present invention provides a cell phone topper, which includes an attachment having a support portion and a lighted sign having indicia, A further embodiment of the device of the present invention provides a cell phone topper, which includes an attachment having a support portion and an animated moving portion.

Other objects and advantages of the present invention will be more readily apparent from the following detailed description when read in conjunction with the accompanying drawings.

BRIEF DESCRIPTION OF THE DRAWINGS

FIG. 1 is a front perspective view of a cell phone topper having a display portion and a support portion according to the present invention, shown mounted on a cell phone which is in dashed outline.

FIG. 2 is a rear perspective view of the cell phone topper of FIG. 1.

FIG. 3 is a front perspective view of the cell phone topper of FIG. 1, without the cell phone.

FIG. 4 is a rear perspective view of the cell phone topper of FIG. 1, without the cell phone.

DETAILED DESCRIPTION OF THE INVENTION

Figure 5:
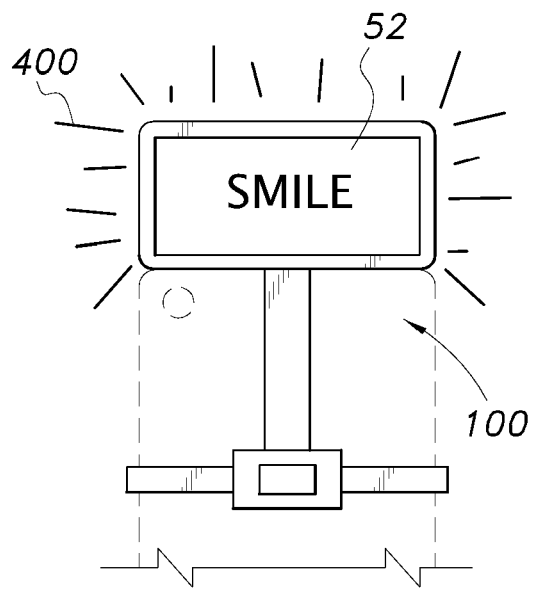
FIG. 5 is a front elevational view of the cell phone topper of FIG. 1, with the word SMILE on the display portion.

The present invention is intended to hold the attention of a subject long enough to get a good picture, i.e., long enough for the photographer to perform one or more of the following: frame the subject, adjust the focus, adjust lighting, adjust magnification, and select flash settings.

The present invention is useful as an aid in taking pictures of subjects in natural settings and social settings in which the subjects are not posed, and which nonetheless capture the face of the subject. The present invention is an attachment for a cell phone of the type having a camera. The subject can be a person such as an adult, a child, or an infant. And, the subject can be an animal or pet. In addition, the present invention can operate without the need for sound and without need for a spoken request.

The term "cell phone" is defined herein to include all devices referred to as cell phones and all devices referred to as smart phones, and which include a camera.

The present invention is convenient, low in cost, easy to carry, easy to assemble to a cell phone, and easy to use. The present invention can capture the attention of subjects in public settings and social settings, for photography as well as for other purposes such as marketing and advertising.

FIG. 1 is a front perspective view of a cell phone topper 100 having a front display portion 50 held by a frame 40, the frame 40 being supported by a thin beam 30. The thin beam 30 is held by a connecting member 20. The connecting member is centrally disposed along a thin holding member 10. The thin holding member 10 has two opposed ends 12 and 14 which generally are U-shaped, the holding member 10 and its ends 12 and 14 being adapted to grip the sides and back of a cell phone 200 which is shown in dashed outline. In FIG. 1, light rays are schematically indicated by radiating lines as indicated by an arrow 400, showing that the display portion 50 is illuminated and is radiating light that is sufficiently bright so as to be attention-getting.

The holding member 10 may be a unitary member, and is preferably composed a resiliently deformable material to allow it to be snapped onto the cell phone quickly using manual pressure; and in that case the members holding member 10 and the thin beam 30 can be formed as an integral member by conventional plastic or rubber molding methods. Or, the holding member 10 can be rigid, and the cell phone then can be slid within the U-shaped ends 12 and 14, until the top end of the cell phone 200 abuts the frame 40. Or, the holding member 10 can be composed of two movable arms that can telescope to extend or retract from the connecting member 20 so as to conform to a range of sizes of cell phones. Such variations in the holding member would be known to any one having skill in the cell phone car mount arts, wherein the cell phone can be supported by a car vent or the like. All such variations in materials and construction are contemplated as being within the scope of the present invention.

The cell phone 200 has a back 206, opposed sidewalls 202 and 204, and a photographic lens element 210. Differing models of cell phones can have different dimensions and differing locations of the lens element 210. The relative dimensions of the elements 10, 20, and 30 of the present invention can be varied so that—for a given respective type of cell phone—the respective lens element 210 is not obstructed.

The front display portion 50 is illuminated from behind by an LED light source 300, shown schematically in dashed outline in FIG. 1. The display portion 50 is preferably a thin translucent material which is illuminated from behind by the light source 300. Other light sources can be used, including incandescent, florescent, chemical luminescence using liquids in thin tubes (conventionally known), and/or any other type of light source whether alone or in any combination. The display portion 50 can be simply a thin panel as noted above with the light source 300 behind it, or the display portion 50 can be one of two parallel panels which sandwich the light source 300 between them and—together with the frame portion 40—forming an enclosure for the light source 300.

FIG. 2 is a rear perspective view of the cell phone topper 100 of FIG. 1. In this view, the front of the cell phone 200 is shown in dashed outline, including the front display area 208 where an image from the cell phone camera can be viewed and where camera controls are typically located. Also in FIG. 2, a panel 60 is shown, held by the frame 40. The U-shaped ends 12 and 14 are shown gripping the front of the cell phone 200. An ON/OFF switch 320 is provided at the rear of the panel 60, which turns an LED 304 (shown in FIG. 18) ON and OFF.

Figure 18:
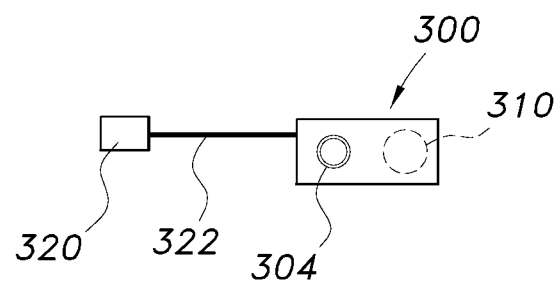
FIG. 18 is a schematic diagram showing a switch, a connector, and an light, for use in the display.

The LED 304 shown in FIG. 18 can be a single LED, or can be plural LED's, and can be in a single color or can be in more than one color, and such arrangements of color are known in the LED art. As noted above, the present invention is not limited to LED's, and any type of light source can be used; all such variations are contemplated as being within the scope of the invention.

In the preferred embodiment, the LED 304 is a blinking LED light, so as to attract attention from the photographic subjects to be captured in a photograph by the cell phone camera. It is also contemplated that the LED 304 can be a color-changing LED, and such color changing lights are known in commercial lighted decorations and lights. It is contemplated that the LED can be a steady light, without blinking, and all such variations are contemplated as being within the scope of the invention.

FIG. 3 is a front perspective view of the cell phone topper 100 of FIG. 1, by itself and without the cell phone 200. In this view, the display portion 50 is removed, revealing a central enclosure, and wherein a front part of the panel 60 (which is seen from the rear in FIG. 2) is visible. The light source 300 is schematically shown as being disposed within the enclosure, electrically connected to the ON/OFF switch 320 by an electrical connector 322.

While one type of ON/OFF switch is shown, other types could be used, such as capacitance, sonar, magnetic, and so on. All such variations are contemplated as being within the scope of the invention.

FIG. 4 is a rear perspective view of the cell phone topper 100 of FIG. 2, without the cell phone 200. This is as described in FIGS. 1, 2, and 3 above.

FIG. 5 is a front elevational view of the cell phone topper 100 of FIG. 1, with the word SMILE on the display portion as indicia 52. The display portion 50, and the similar display portions discussed below, can be made in the form of cards insertable into the frame in a manner similar to license plate holders, which are well known. Alternatively, the display portion 50 can be molded together with the frame 40, and the indicia 52 then printed or painted thereon.

Figure 6:
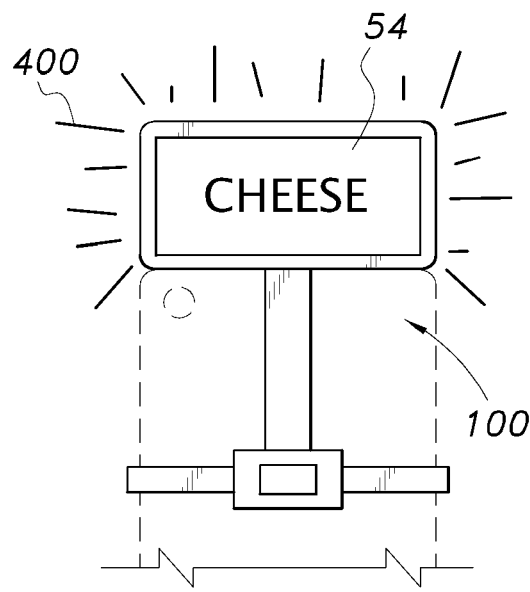
FIG. 6 is a front elevational view of the cell phone topper of FIG. 1, with the word CHEESE on the display portion.

FIG. 6 is a front elevational view of the cell phone topper 100 of FIG. 1, with the word CHEESE as indicia 54 on the display portion.

Figure 7:
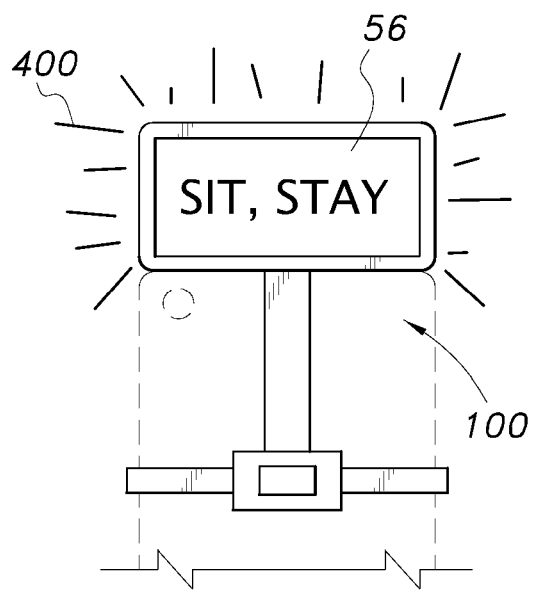
FIG. 7 is a front elevational view of the cell phone topper of FIG. 1, with the words SIT, STAY on the display portion.

FIG. 7 is a front elevational view of the cell phone topper 100 of FIG. 1, with the words SIT, STAY as indicia 56 on the display portion.

Figure 8:
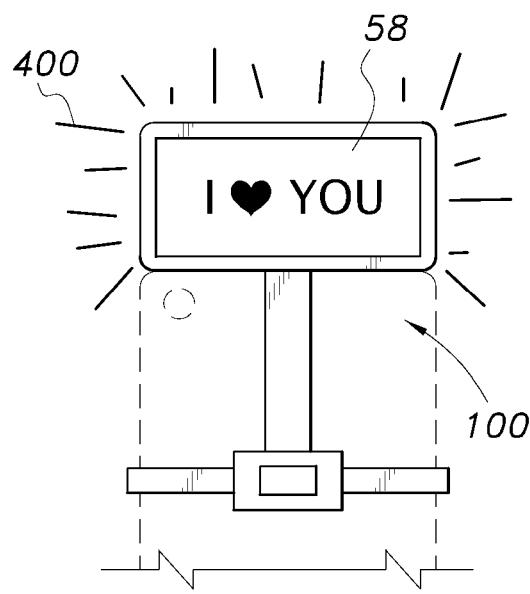
FIG. 8 is a front elevational view of the cell phone topper of FIG. 1, with the word I, followed by a heart symbol, and followed by the word YOU on the display portion.

FIG. 8 is a front elevational view of the cell phone topper 100 of FIG. 1, with the word I, followed by a heart symbol, and followed by the word YOU as indicia 58 on the display portion.

Figure 9:
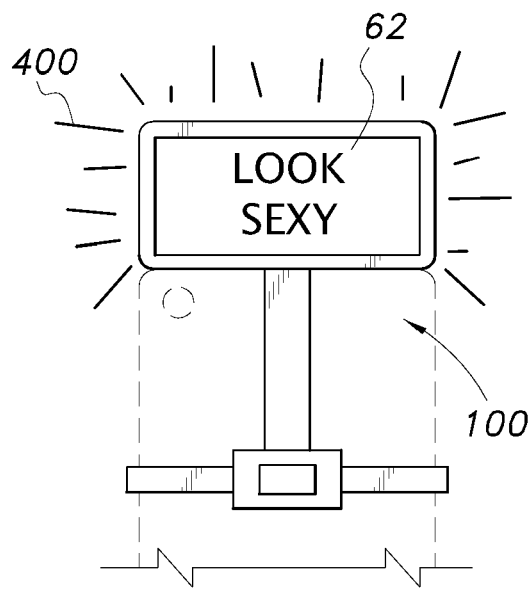
FIG. 9 is a front elevational view of the cell phone topper of FIG. 1, with the words LOOK SEXY on the display portion.

FIG. 9 is a front elevational view of the cell phone topper 100 of FIG. 1, with the words LOOK SEXY as indicia 62 on the display portion.

Figure 10:
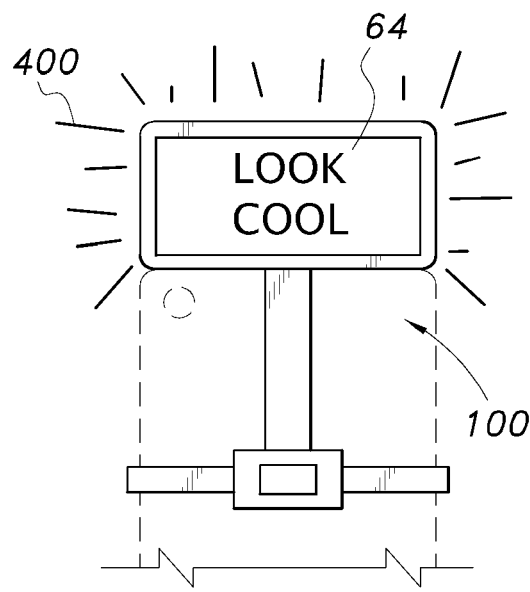
FIG. 10 is a front elevational view of the cell phone topper of FIG. 1, with the words LOOK COOL on the display portion.

FIG. 10 is a front elevational view of the cell phone topper 100 of FIG. 1, with the words LOOK COOL as indicia 64 on the display portion.

Figure 11:
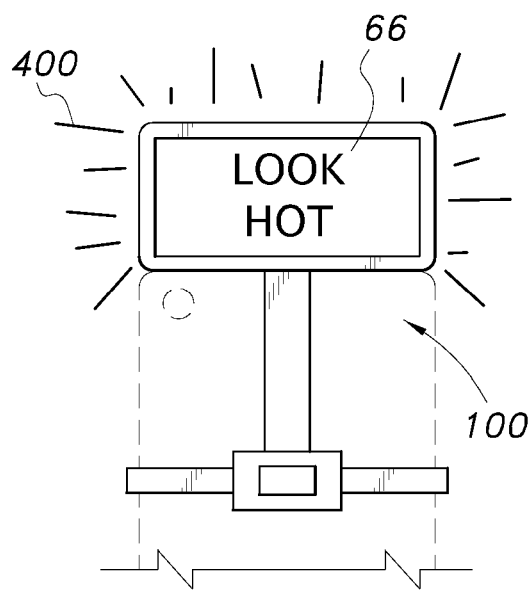
FIG. 11 is a front elevational view of the cell phone topper of FIG. 1, with the words LOOK HOT on the display portion.

FIG. 11 is a front elevational view of the cell phone topper 100 of FIG. 1, with the words LOOK HOT as indicia 66 on the display portion.

Figure 12:
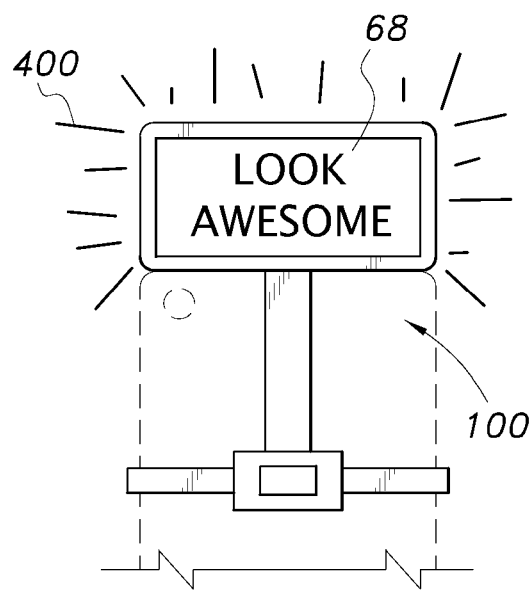
FIG. 12 is a front elevational view of the cell phone topper of FIG. 1, with the words LOOK AWESOME on the display portion.

FIG. 12 is a front elevational view of the cell phone topper 100 of FIG. 1, with the words LOOK AWESOME as indicia 68 on the display portion.

Figure 13:
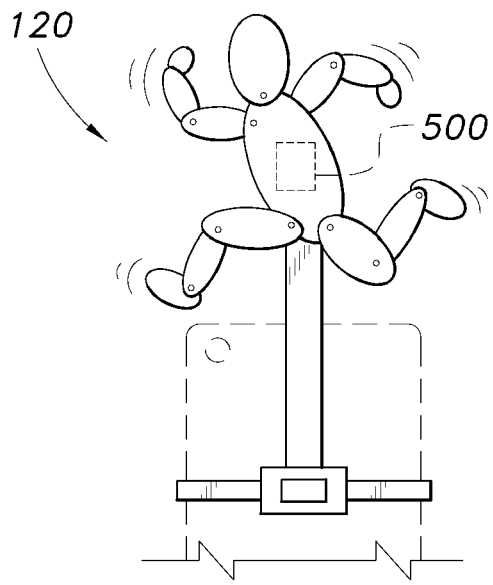
FIG. 13 is a front elevational view of a further embodiment of a cell phone topper, with a moving display in the form of a running man.

FIG. 13 is a front elevational view of a further embodiment of a cell phone topper 100, with a moving display 120 in the form of a running man, and a vibratory motor 500 (shown in dashed outline) operating the figure by vibratory motion. The FIG. 500 can be jointed, so that the jointed parts move around in various directions when vibrated. The motor 500 can be spring wound, as shown in FIG. 18. In an alternative embodiment, the motor can be an electrical motor with a battery or with a solar power supply.

The motor 500 can alternatively have a rotational output to rotate parts, to cause more complex motions, for more complex types of displays.

Figure 14:
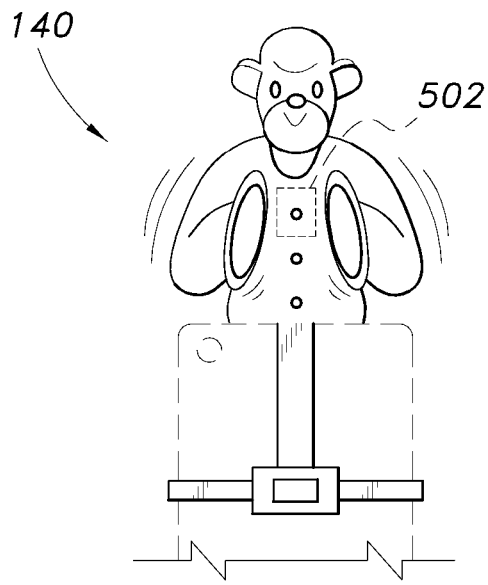
FIG. 14 is a front elevational view of a further embodiment of a cell phone topper, with a moving display in the form of a monkey-like figure holding musical cymbals.

FIG. 14 is a front elevational view of a further embodiment of a cell phone topper 100, with a moving display 140 in the form of a monkey-like figure holding musical cymbals.

Figure 15:
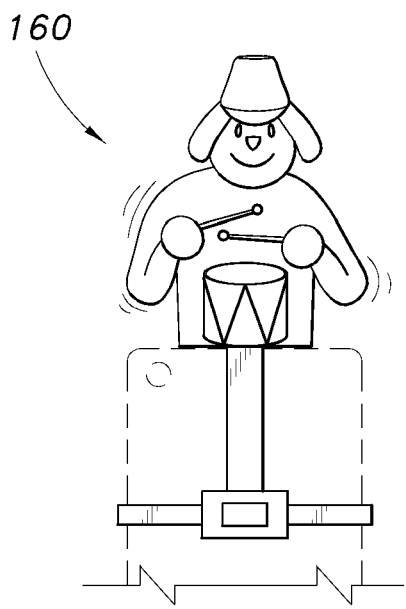
FIG. 15 is a front elevational view of a further embodiment of a cell phone topper, with a moving display in the form of a drummer playing a drum.

FIG. 15 is a front elevational view of a further embodiment of a cell phone topper 100, with a moving display in the form of a drummer 160 playing a drum.

Figure 16:
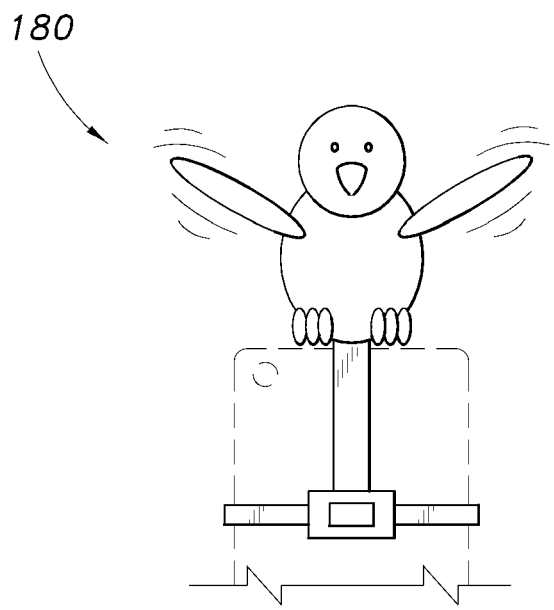
FIG. 16 is a front elevational view of a further embodiment of a cell phone topper, with a moving display in the form of a bird with extended wings.

FIG. 16 is a front elevational view of a further embodiment of a cell phone topper 100, with a moving display in the form of a bird 180 with extended wings.

Figure 17:
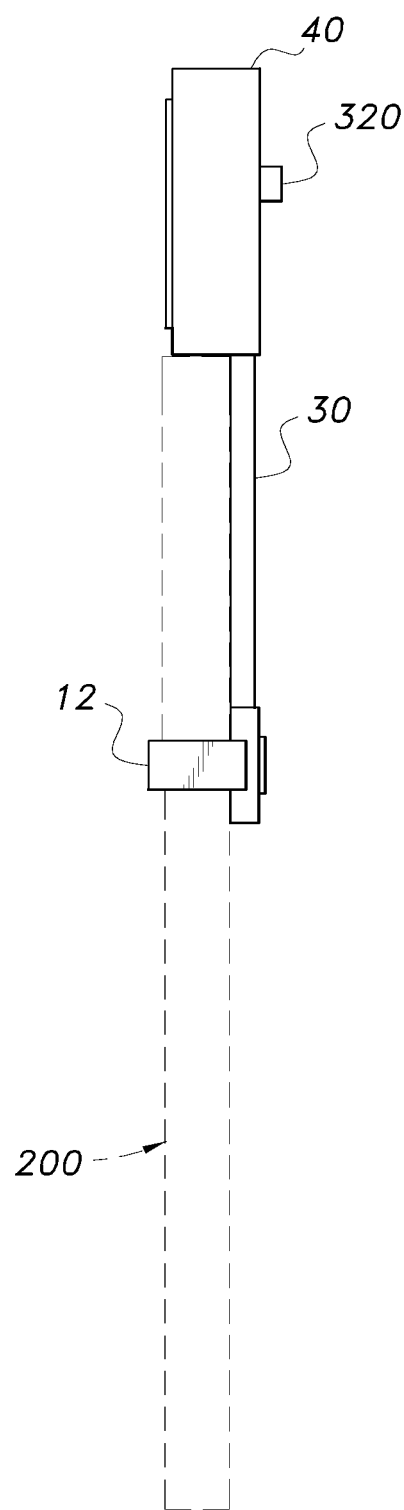
FIG. 17 is a side view of the device of FIGS. 1 and 2, showing the cell phone and the cell phone topper in side view.

FIG. 17 is a side view of the device of FIGS. 1 and 2, showing the cell phone 200 and the cell phone topper 100 in side view. This view also shows the frame 40 and the thin beam 30 in side view, and also shows the ON/OFF switch 320 in side view.

FIG. 18 is a schematic diagram schematically showing the elements of the light source 300. The light component 300 includes the switch 320, the connector 322, the LED 304, and a battery 310 to power the LED 304, for use in the display. The circuit is schematically shown, and any one having skill in the electrical lighting arts would know how to make and use such a circuit.

Figure 19:
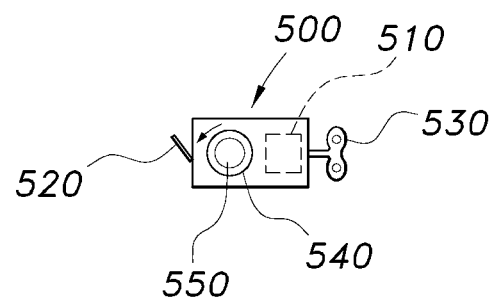
FIG. 19 is a schematic diagram showing a vibratory motor with an eccentric weight, for use in the display.

FIG. 19 is a schematic diagram showing a vibratory motor 500 with an eccentric weight 550, for use in the display. The motor 500 has rotating disk 540, a manual winding key 530 for winding a spring 510, and includes a START/STOP lever 520. When ON, the rotating disk 540 is powered by the spring 510 to rotate, and the eccentric weight 550 causes vibratory forces to occur causing a shaking motion. Any one having skill in the mechanical toy arts, and in the vibratory motor arts, would know how to make and use the vibratory motor 500.

Figure 20:
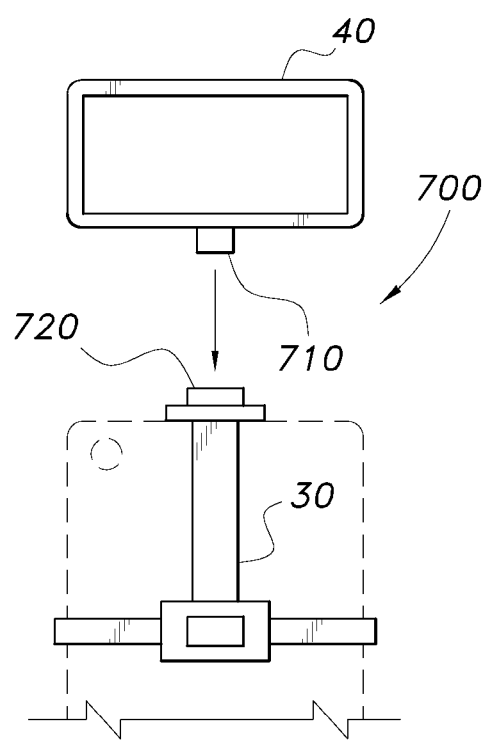
FIG. 20 schematically shows a further embodiment of the present invention, in which the uppermost portion is manually replaceable, so that the messages can be changed and replaced.

FIG. 20 schematically shows a further embodiment 700 of the present invention, in which the uppermost portion 40 (not numbered in this view, numbered in the preceding figures) is manually replaceable, so that the messages can be changed and replaced. This embodiment includes a receiving portion 720 at the top of the thin beam 30 (shown and numbered in the preceding figures) and a projecting end 710 at the bottom of the frame portion 40. In this embodiment, the projecting end 710 and the receiving portion 720 replace the uppermost portion of the thin beam 30 of the preceding figures.

In FIG. 20, the projecting end 710 of the frame portion 40 is referred to herein as a first separable connecting portion, and the receiving portion 720 of the thin beam 30 is referred to herein as a second separable connecting portion, said second separable connecting portion being adapted to mate with said first separable connecting portion to connect said display portion 40 to said connecting member 30. In this view, the first separable connecting portion is a male element, and the second separable connecting portion is a female element adapted to made with the male element of the first separable connecting portion.

According to FIG. 20, the frame portion 40 is secured to the thin beam 30 by insertion of the projecting portion 710 into the receiving portion 720. The portions 710 and 720 can be interchanged, so that the portion 720 is on the frame and the portion 710 is atop the thin beam 30, and this variation is also contemplated as being within the scope of the present invention. The connection between portions 710 and 720 can be secured by frictional fit, or by other securing methods including a snap fit arrangement, and all such connection methods are contemplated as being within the scope of the present invention.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. A cell phone topper for attachment to a smart phone to attract attention of subjects in public settings and social settings, the cell phone having a body including a top portion and two opposed sides, the body of the cell phone having a camera and a camera lens, wherein each subject's eyes are directed toward the camera lens of the cell phone, comprising:

a light source, for illuminating said display portion, and is radiating light that is sufficiently bright so as to be attention getting;

a frame adapted to be mounted on the top portion of the cell phone;

a connecting member connecting a relatively thin holding member to a thin beam;

the relatively thin holding member having two opposed ends which are adapted to respectively engage and grip opposed sides of said body of said cell phone; said relatively thin holding member being connected to said connecting member so as to support said connecting member in a fixed position relative to said body of said cell phone; the thin beam having a lower end and an upper end, said upper end of said thin beam being connected to said frame for supporting said frame; said lower end of said thin beam being connected to said connecting member such that said thin beam is secured in position relative to said body of said cell phone; a width of said thin beam being relatively thin relative to a width of said connecting member; a width of said holding member is relatively thin relative to the width of said thin beam; said thin beam extending vertically toward said top portion of said body of said cell phone; a display portion supported by said frame; and said connecting member being adapted to be mounted on said body of said smart phone, the width of said connecting member being relatively thin compared to a width of said body of said cell phone; said display portion being supported by said thin beam which is supported by said connecting member and which in turn is supported by said holding member to extend said display portion above said top portion of said cell phone and above the lens of said cell phone, whereby a subject is drawn to look at said display portion so that the subject will be looking at said camera and said camera lens of said cell phone during use of said camera.

2. A cell phone topper as claimed in claim 1, wherein said connecting member comprises a body having a slot which is rectangular and is adapted to support said display portion.

3. A cell phone topper as claimed in claim 2, wherein said connecting member includes a holding member adapted to grip the two opposed sides of the smart phone, said holding member having a body which has a thin flat portion and two ends so as to form a U-shape.

4. A cell phone topper as claimed in claim 1, wherein said light source comprises a lamp, a power source, and an ON/OFF switch.

5. A cell phone topper as claimed in claim 4, wherein said lamp is an LED, and wherein said light source is mounted inside said frame; and wherein said display portion is oriented so as to be visible to subjects in front of the smart phone.

6. A cell phone topper as claimed in claim 1, further comprising a vibratory motor, adapted to vibrate said display portion, to attract attention of subjects in front of the smart phone.

7. A cell phone topper as claimed in claim 1, further comprising a vibratory motor, and wherein said vibratory motor comprises a spring, a rotating disk driven by said spring, and a START/STOP lever for starting and stopping said rotating disk.

8. A cell phone topper as claimed in claim 7, further comprising a key for winding said spring.

9. A cell phone topper as claimed in claim 7, wherein said display portion carries a message from one of the following messages: (a) SMILE, (b) CHEESE, (c) SIT/STAY, (d) the letter "I" followed by a heart symbol and the word "YOU", (e) LOOK SEXY, (f) LOOK COOL, (g) LOOK HOT, and (h) LOOK AWESOME.

\* \* \* \* \*